(12) United States Patent
Qin

(10) Patent No.: US 12,449,212 B2
(45) Date of Patent: Oct. 21, 2025

(54) HEAT DISSIPATION STRUCTURE FOR A CASTING BLOCK ASSEMBLY

(71) Applicant: Vitesco Technologies USA, LLC, Auburn Hills, MI (US)

(72) Inventor: Jianrong Qin, Rochester Hills, MI (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 0 days.

(21) Appl. No.: 17/818,468

(22) Filed: Aug. 9, 2022

(65) Prior Publication Data

US 2024/0053114 A1  Feb. 15, 2024

(51) Int. Cl.
*F28F 13/12* (2006.01)
*B60H 1/00* (2006.01)

(52) U.S. Cl.
CPC ......... *F28F 13/12* (2013.01); *B60H 1/00328* (2013.01); *B60H 1/00392* (2013.01)

(58) Field of Classification Search
CPC .. F28F 13/12; F28F 1/422; F28F 1/424; F28F 1/16; F28F 21/04; F28F 1/40; B60H 1/00328; B60H 1/00392; H01M 2220/20; B22D 19/0072
See application file for complete search history.

(56) References Cited

U.S. PATENT DOCUMENTS

| | | | | |
|---|---|---|---|---|
| 4,902,476 A | * | 2/1990 | Gordon | B01D 63/02 165/184 |
| 6,330,395 B1 | * | 12/2001 | Wu | H05B 3/283 392/494 |
| 6,789,608 B1 | * | 9/2004 | Wiggs | F24T 10/15 165/45 |
| 2011/0259040 A1 | * | 10/2011 | Cataldo | F28F 19/04 427/404 |
| 2018/0106500 A1 | * | 4/2018 | Kraft | F24H 3/087 |

FOREIGN PATENT DOCUMENTS

| | | | |
|---|---|---|---|
| CN | 2399698 Y | * | 10/2000 |
| CN | 207163262 U | * | 3/2018 |
| WO | WO-2018172084 A1 | * | 9/2018 |

* cited by examiner

*Primary Examiner* — Harry E Arant

(57) ABSTRACT

A heat dissipation structure for a casting block assembly, which includes a tube extending through a casting block, and the tube has at least one turbulence generating device to promote turbulence inside the tube and reduce boundary layer thickness, and therefore increase the heat transfer coefficient. The turbulence generating device is one or more ribs or dimples integrally formed as part of the tube, before forming the casting block around a portion of the tube. The ribs or dimples promote turbulence to reduce boundary layer thickness, and therefore increase the heat transfer coefficient. The turbulence generating devices promote higher turbulence intensity, a thinner boundary layer thickness, increased heat transfer coefficient, and a stronger bond between the tube and the casting block. The tube may have an elliptical cross-section, which allows for increased spacing between various portions of the tube while maintaining the same cross-sectional flow area, enhancing heat transfer.

14 Claims, 4 Drawing Sheets

HEAT DISSIPATION STRUCTURE FOR A CASTING BLOCK ASSEMBLY

FIELD OF THE INVENTION

The invention relates generally to a casting block assembly having a heat dissipation structure to improve the heat transfer from a coolant to a casting block.

BACKGROUND OF THE INVENTION

Electric vehicles have cooling systems to provide desired thermal management of various electrical components, such as electric motors, inverters, on-board chargers, high-voltage boxes, batteries, and the like. One component in the cooling system is a tube cooler, which includes at least one tube, where coolant flows through the tube. In some systems, the tube is at least partially encased in a housing, which may be made from a diecast material, such as aluminum. The housing functions as a heat sink, allowing heat to dissipate from the coolant tube.

However, the heat transfer performance of these types of tube coolers is limited by the heat transfer coefficient between the coolant and the tube. The tube typically has a smooth inner surface, such that turbulence in the tube is less than desired, which leads to a thick flow boundary layer and low heat transfer coefficient between the solid wall of the tube and the liquid. This results in limited thermal management of the electrical components.

Accordingly, there exists a need for an improved tube cooler which has a desirable heat transfer coefficient between the tube and coolant to meet various thermal management requirements.

SUMMARY OF THE INVENTION

The present invention is a heat dissipation structure for a casting block assembly which may be used as part of a tube cooler for an electric vehicle, where the tube cooler is used for thermal management of various electrical components of the electric vehicle. In an embodiment, the casting block assembly includes a tube extending through a casting block, and the tube has at least one turbulence generating device to promote turbulence inside the tube and reduce boundary layer thickness, and therefore increase the heat transfer coefficient between the coolant and the tube.

In an embodiment, the turbulence generating device is one or more ribs or dimples integrally formed as part of the tube, before forming the casting block around a portion of the tube. The ribs or dimples promote turbulence to reduce boundary layer thickness, and therefore increase the heat transfer coefficient.

The turbulence generating devices promote higher turbulence intensity, a thinner boundary layer thickness, increased heat transfer coefficient, and a stronger bond between the tube and the casting block.

In an embodiment, the tube has an elliptical cross-section, which allows for increased spacing between various portions of the tube, and increases the surface area of the tube, and therefore increases the surface area of the tube which is in contact with the coolant, while maintaining the same cross-sectional flow area, enhancing heat transfer. In an embodiment, the tube having an elliptical shape is used to reduce the cross-sectional flow area, therefore increasing flow speed at a specified flow rate, increasing the heat transfer coefficient and total heat transfer rate.

In an embodiment, the orientation of the tube having an elliptical cross-section may be changed to create a thinner but larger casting block to provide a different heat transfer coefficient and meet different packaging requirements, increasing design flexibility.

In an embodiment, the present invention is a casting block assembly having a turbulence generating device, where the casting block assembly includes a casting block and a tube extending through the casting block. In an embodiment, the tube includes a first end, a first portion integrally formed with the first end, a second end, and a second portion integrally formed with the second end, the second portion in fluid communication with the first portion.

In an embodiment, a first turbulence generating device is integrally formed as part of the first portion, and a second turbulence generating device integrally formed as part of the second portion. The first turbulence generating device and the second turbulence generating device are surrounded by the casting block.

In an embodiment, the first turbulence generating device is a first plurality of ribs integrally formed as part of the first portion of the tube, and the second turbulence generating device is a second plurality of ribs integrally formed as part of the second portion of the tube.

In an embodiment, the first portion of the tube and the second portion of the tube are parallel to each other.

In an embodiment, the first portion of the tube and the second portion of the tube are the same length.

In an embodiment, the first turbulence generating device and the second turbulence generating device are the same length.

In an embodiment, the tube includes a third portion, and the third portion of the tube is disposed between the first portion and the second portion.

In an embodiment, the first portion of the tube and the second portion of the tube have an elliptical cross-section.

In an embodiment, a first vertex is integrally formed as part of the first portion, a second vertex is integrally formed as part of the first portion, and a first co-vertex is integrally formed as part of the first portion such that the first co-vertex is integrally formed with the first vertex of the first portion and the second vertex of the first portion, and a second co-vertex integrally is formed as part of the first portion such that the second co-vertex is integrally formed with the first vertex of the first portion and the second vertex of the first portion.

In an embodiment, a first vertex is integrally formed as part of the second portion, and a second vertex is integrally formed as part of the second portion. A first co-vertex is integrally formed as part of the second portion, such that the first co-vertex is integrally formed with the first vertex of the second portion and the second vertex of the second portion, and a second co-vertex is integrally formed as part of the second portion, such that the second co-vertex is integrally formed with the first vertex of the second portion and the second vertex of the second portion.

In an embodiment, the first vertex integrally formed as part of the first portion and the first vertex integrally formed as part of the second portion are the parts of the first portion and the second portion which are closest to one another.

In an embodiment, the first co-vertex integrally formed as part of the first portion and the first co-vertex integrally formed as part of the second portion are the parts of the first portion and the second portion which are closest to one another.

In an embodiment, the first end of the tube and the second end of the tube protrude out of the same side of the casting block.

In an embodiment, the inner diameter of the plurality of ribs is 25% less than the diameter of the tube.

In an embodiment, in the tube has an elliptical cross-section.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
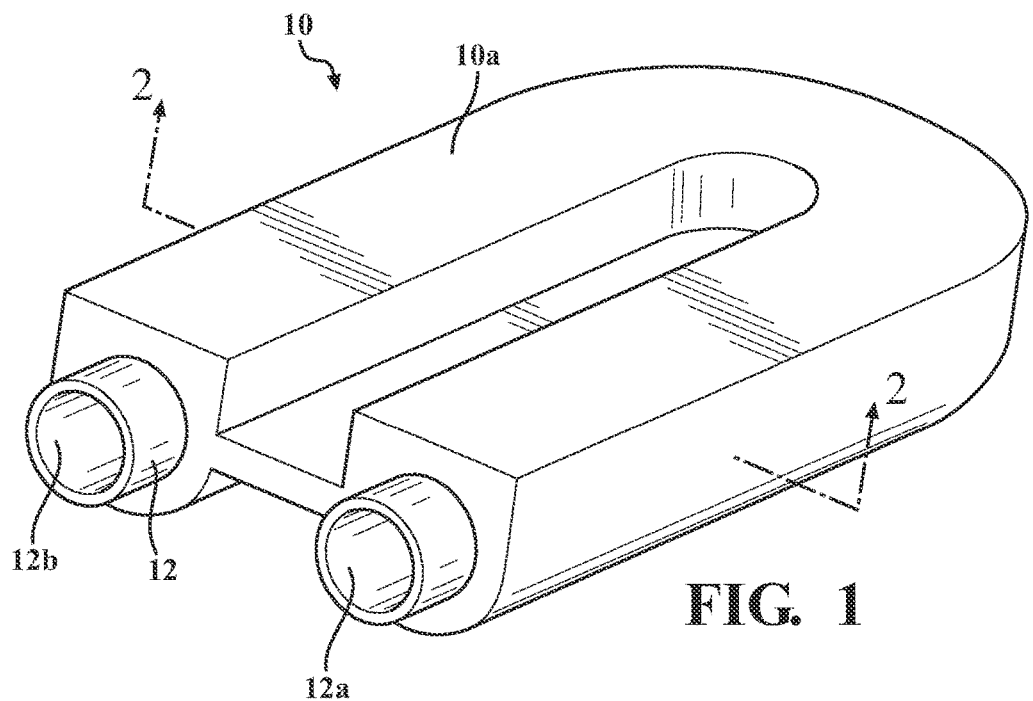
FIG. 1 is a perspective view of a casting block assembly having a tube with at least one turbulence generating device, according to embodiments of the present invention.
Figure 2:
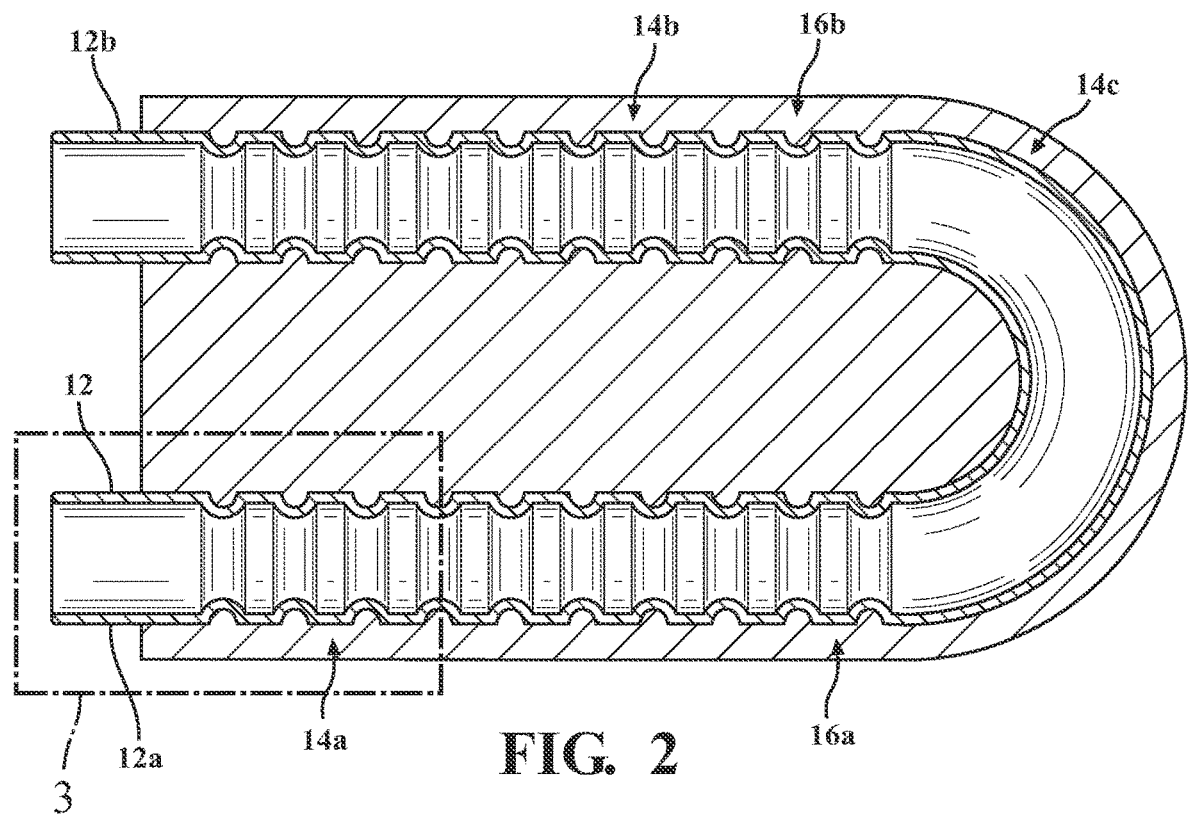
FIG. 2 is a sectional view taken along lines 2-2 of FIG. 1.
Figure 3:
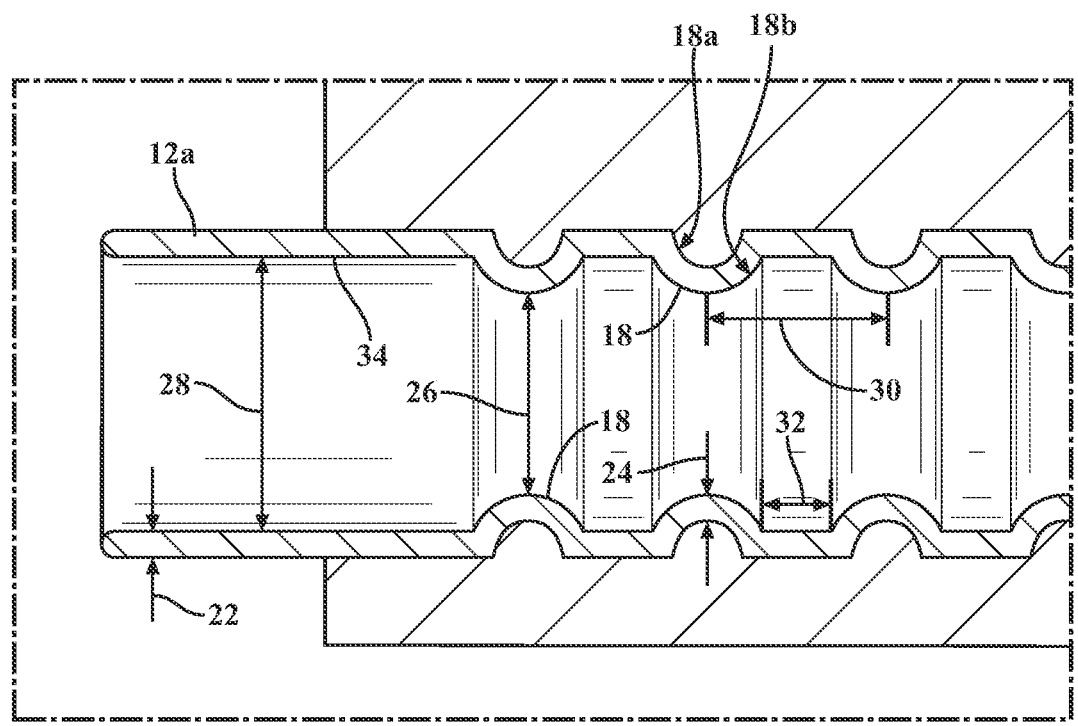
FIG. 3 is an enlarged view of the squared section of FIG. 2.

Referring to FIGS. 1-3, a casting block assembly having a casting block which surrounds a tube having a turbulence generating device is shown generally at 10. In an embodiment, the casting block assembly 10 is part of a tube cooler for an electric vehicle, where the tube cooler is used for thermal management of various electrical components of the electric vehicle. A tube 12 extends through the casting block 10a, the tube 12 is generally U-shaped, and has a first end 12a and a second end 12b. The first end 12a is part of a first portion, shown generally at 14a, of the tube 12, and the second end 12b is part of a second portion, shown generally at 14b, of the tube 12. The first portion 14a and second portion 14b are generally straight, and parallel to each other. Integrally formed with the first portion 14a and the second portion 14b is a third portion, shown generally at 14c, which is curved.

Integrally formed as part of the first portion 14a is a first turbulence generating device, shown generally at 16a, and integrally formed as part of the second portion 14b is a second turbulence generating device, shown generally at 16b. In the embodiment shown, the first turbulence generating device 16a includes a first plurality of rib portions or ring dimples 18, and the second turbulence generating device 16b includes a second plurality of rib portions 20. Each of the plurality of rib portions 18,20 have a first radius, or inner radius of 18a, and a second radius, or outer radius 18b. In the embodiment shown, the inner radius 18a is 4.5 mm, and the outer radius 18b is 6 mm. The tube 12 has a consistent sidewall thickness, such that the thickness 22 in the areas of the tube 12 unoccupied by the rib portions 18,20 is approximate to the thickness 24 of the rib portions 18,20. In this embodiment, the thickness 22 is 1.5 mm, but it is within the scope of the invention that the tube 12 may have other thicknesses.

The radiuses 18a,18b of the rib portions 18 results in the rib portions 18 having an inner diameter 26 which is, in this embodiment, 25% smaller than the inner diameter 28 of the tube 12. In this embodiment, the inner diameter 26 of the rib portions 18 is 9 mm, and the inner diameter 28 of the tube 12 is 12 mm, but it is within the scope of the invention that other diameters may be used.

The rib portions 18 are also equally spaced apart from one another. In the embodiment shown, there is a peak-to-peak spacing 30 between the rib portions 18 of 8 mm, but it is within the scope of the invention that other spacing could be used. In addition to the spacing 30, there is also a distance 32 between the ends of the rib portions 18. In this embodiment, the distance 32 is 3 mm, but it is within the scope of the invention that other distances may be used.

The flow of fluid, or coolant, through the tube 12 includes a hydraulic boundary layer (not shown) and a thermal boundary layer (not shown) which is adjacent the inner surface 34 of the tube 12. The thickness and shape of the boundary layers varies along the length of the turbulence generating devices 16a,16b. Each turbulence generating device 16a,16b generates turbulence of the coolant flowing through the tube 12. This improves the mixing of the coolant, reduces the thickness of the hydraulic boundary layer and the thermal boundary layer, thus improving the heat transfer between the coolant and the tube 12, reducing the temperature of the casting block 10a, and increasing the temperature of the coolant flowing through the tube 12. In addition to supporting the tube 12, the casting block 10a also functions as a heat sink, such that heat from the electrical components is transferred and spread through the casting block 10a and the tube 12, then from the tube 12 to the coolant, reducing the total thermal resistance from the casting block 10a to the coolant. The shape and spacing of the rib portions 18,20 also minimizes the impact on the pressure drop of the coolant flowing through the tube 12.

In the embodiment described, heat is primarily transferred from the casting block 10a (which is hot) to coolant (which is cool) for thermal management of electrical components, such as onboard chargers and HV boxes. However, in alternate embodiments, the casting block assembly 10 may be part of a tube cooler which is configured such that heat is transferred from the coolant to the casting block 10a, if the temperature of the coolant is higher than that of that casting block 10a.

Figure 4:
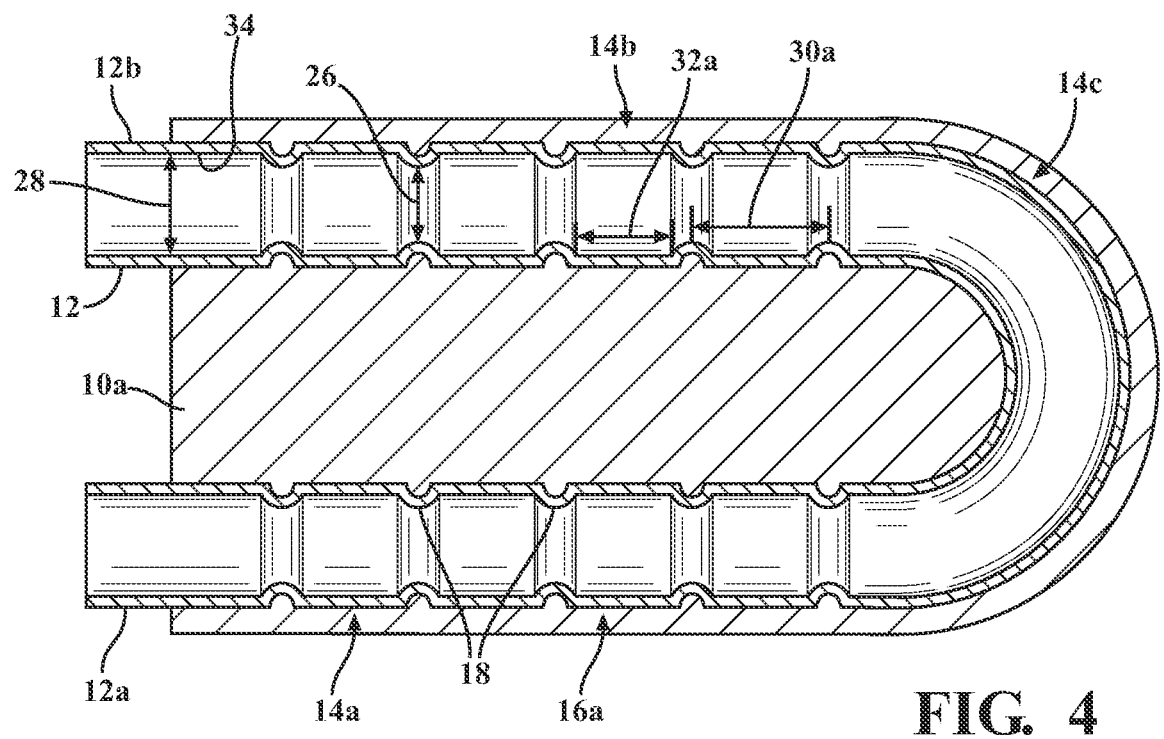
FIG. 4 is a sectional view of an alternate embodiment of a casting block assembly having a tube with at least one turbulence generating device, according to embodiments of the present invention.

Another embodiment of the invention is shown in FIG. 4, with like numbers referring to like elements. In this embodiment, there is different peak-to-peak spacing 30a and a different distance 32a between the rib portions 18, compared to the embodiment shown in FIGS. 1-3. In this embodiment shown in FIG. 4, the peak-to-peak spacing 30a is 16 mm, and the distance 32a between the rib portions 18 is 11 mm. Depending upon the application, the height and spacing of the rib portions 18 are optimized according to the size of the tube 12 and intended flow rate of coolant through the tube 12, such that the turbulence generation is maximized, and any adverse effect of a small flow detachment zone after each rib portions 18 is minimized. Thus, maximum convectional heat transfer is achieved.

Figure 5:
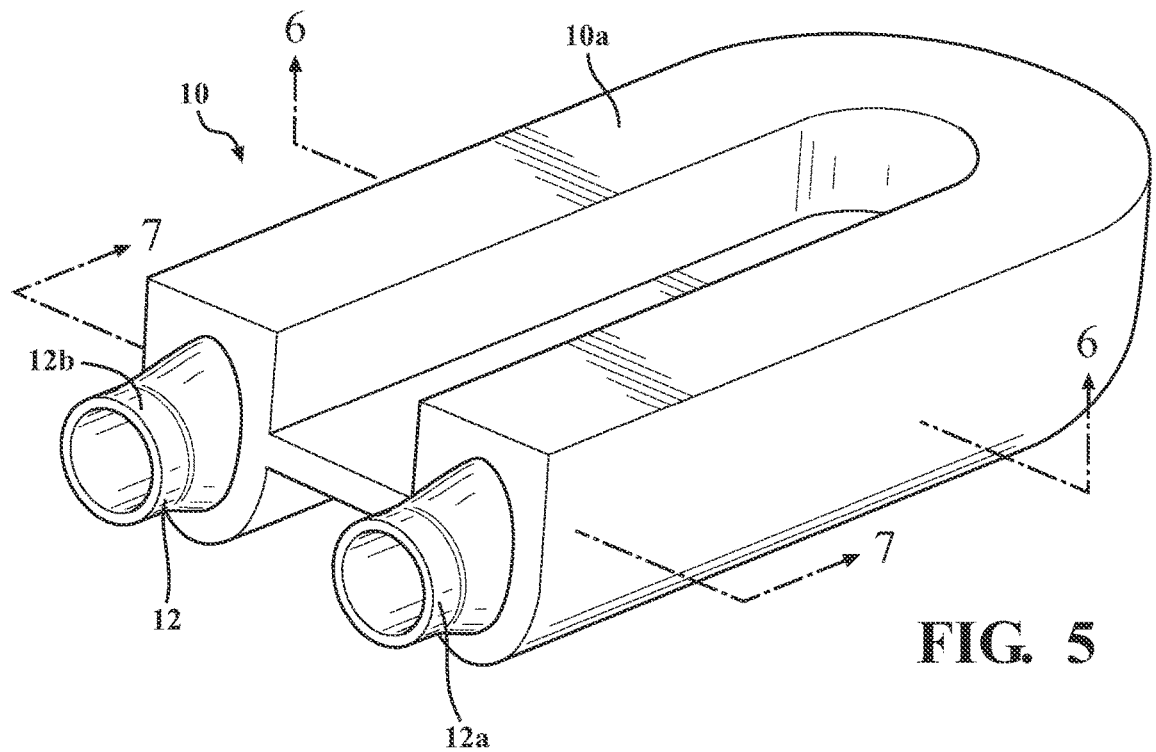
FIG. 5 is a perspective view of another alternate embodiment of a casting block assembly having a tube with at least one turbulence generating device, according to embodiments of the present invention.
Figure 6:
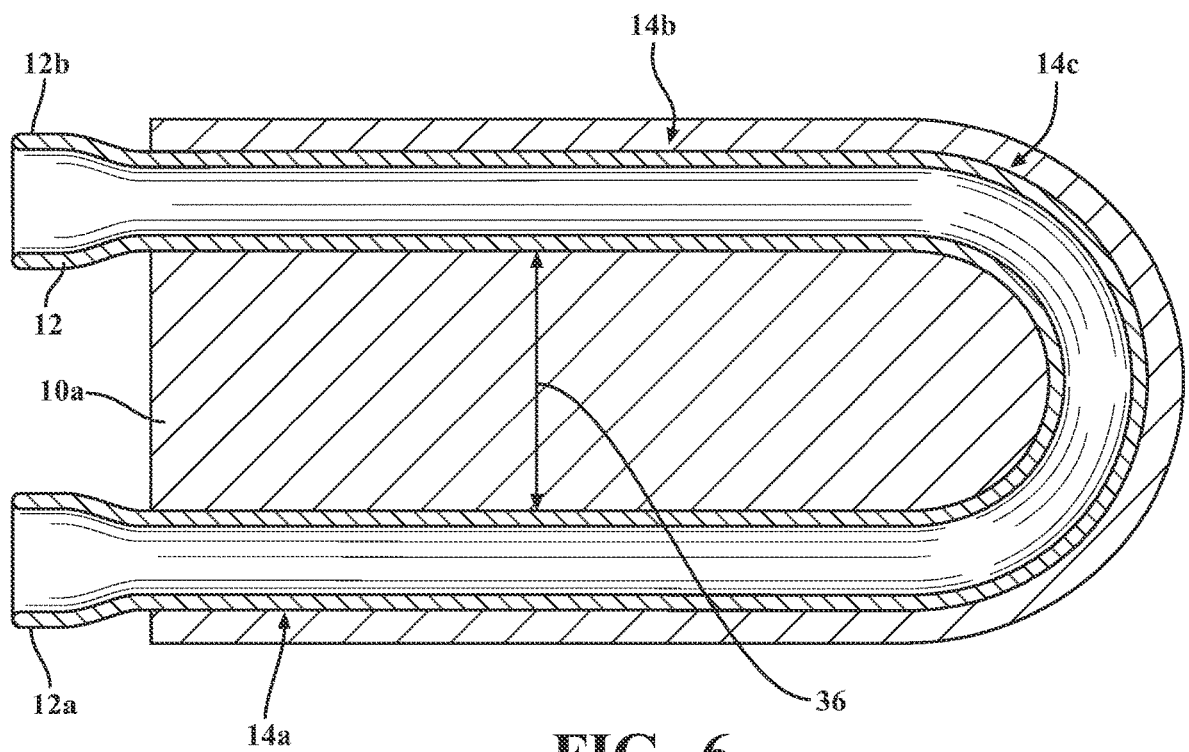
FIG. 6 is a sectional view taken along lines 5-5 of FIG. 4.
Figure 7:
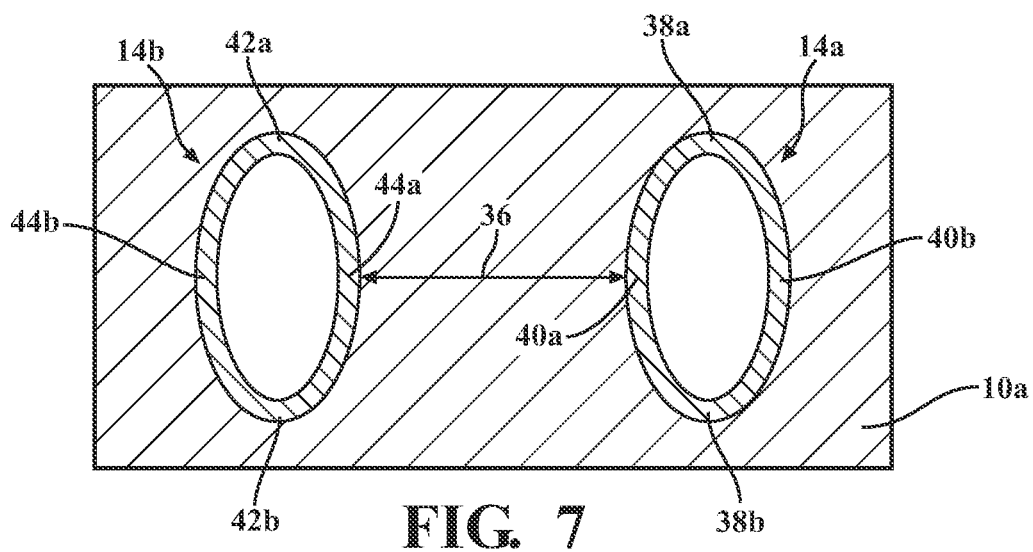
FIG. 7 is a sectional view taken along lines 6-6 of FIG. 4.

Another embodiment of the present invention is shown in FIGS. 5-7, with like numbers referring to like elements. In this embodiment, instead of the tube 12 having the rib portions 18,20, the tube 12 has an oval cross-section. The first portion 14a of the tube 12 has a first vertex 38a and a second vertex 38b, as well as a first co-vertex 40a and a second co-vertex 40b. The second portion 14b of the tube 12 also has a first vertex 42a and a second vertex 42b, as well as a first co-vertex 44a and a second co-vertex 44b. The dimensions of the tube 12 are consistent between the first portion 14a, the second portion 14b, and the third portion 14c, such that the dimensions of the vertexes 38a,38b,42a, 42b and the co-vertexes 40a,40b,44a,44b are the same. The oval cross-section of the tube 12 in this embodiment allows for a greater distance 36 between the co-vertex 40a of first portion 14a and the co-vertex 44a of the second portion 14b compared to the previous embodiment. The distance 36 between the first portion 14a and the second portion 14b allows for greater packaging flexibility for large and tall electrical components.

Figure 8:
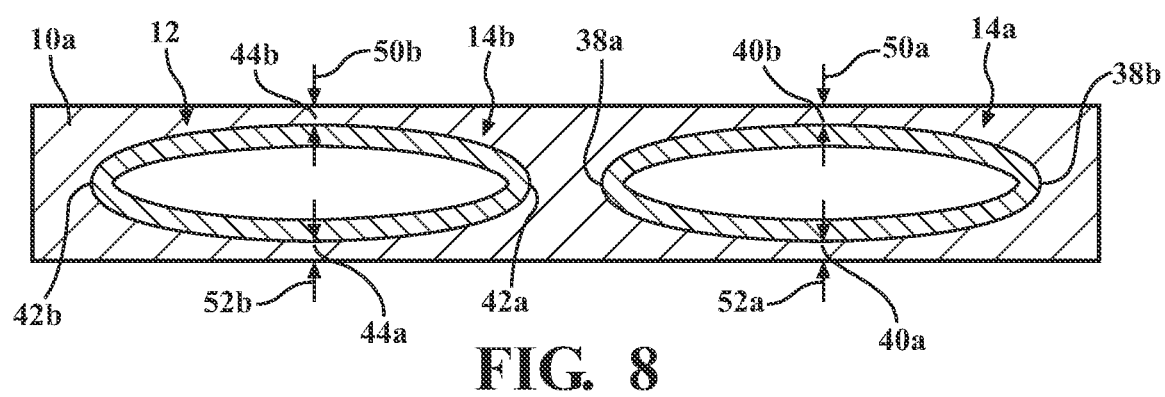
FIG. 8 is a sectional view of another alternate embodiment of a tube casting having a tube with at least one turbulence generating device, according to embodiments of the present invention.

Another alternate embodiment is shown in FIG. 8. In this embodiment, the tube 12 has an oval cross-section, but is oriented such that the vertex 38a of first portion 14a and the vertex 42a of the second portion 14b are the parts of the first portion 14a and the second portion 14b which are closest relative to one another. There is also a shorter distance 50a,50b between the top of the casting block 10a and the co-vertexes 40b,44b of the respective portions 14a,14b of the tube 12, and a shorter distance 52a,52b between the bottom of the casting block 10a and the co-vertexes 40a,44a of the respective portions 14a,14b of the tube 12. One benefit of this configuration is a reduced overall height of the casting block 10a and tube 12, which allows the casting block assembly 10 to meet packaging requirements requiring a reduced overall height. The shorter distances 50a,50b, 52a,52b from the tube 12 to the top and bottom of the casting block provide the benefit of reducing thermal resistance between the tube 12 and the casting block 10a, improving heat transfer.

Figure 9:
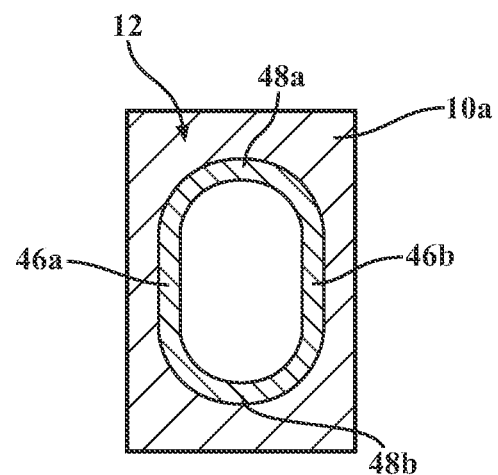
FIG. 9 is a sectional view of another alternate embodiment of a tube casting having a tube with at least one turbulence generating device, according to embodiments of the present invention.

Another alternate embodiment is shown in FIG. 9, where the cross-section of the tube 12 includes a first flat portion 46a and a second flat portion 46b, as well as a first curved portion 48a and a second curved portion 48b. In this embodiment, the tube 12 has similar heat transfer properties as the tube 12 shown in FIGS. 5-7, but the tube 12 having the flat portions 46a,46b simplifies manufacturing.

It should be noted that it is also within the scope of the invention that the various features of the embodiments described above may be incorporated together. For example, the embodiments shown in FIGS. 5-9 may also include the rib portions 18,20 shown in FIGS. 1-4.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
 a casting block assembly having a turbulence generating device, the casting block assembly including:
  a casting block;
  a tube having a first end and a second end, and a curved portion in fluid communication with the first end and the second end, the tube extending through the casting block such that the casting block surrounds the outside of the curved portion, the tube having a circular cross-section; and
  at least one turbulence generating device integrally formed as part of the tube such that the at least one turbulence generating device is adjacent the curved portion, and the casting block surrounds the outside of the at least one turbulence generating device, the at least one turbulence generating device further comprising:
   a plurality of ribs integrally formed as part of the tube, each of the plurality of ribs having a circular cross-section, and the outer diameter of each of the plurality of ribs is less than the inner diameter of the tube, and the outer diameter of each of the plurality of ribs is less than the inner diameter of the first end, and less than the inner diameter of the second end, and less than the inner diameter of the entire curved portion;
  wherein the at least one turbulence generating device is integrally formed as a part of the tube that is surrounded by the casting block.

2. The apparatus of claim 1, the tube further comprising:
 a first portion in fluid communication with the first end; and
 a second portion in fluid communication with the second end and the first portion;
 wherein the first portion of the tube and the second portion of the tube are parallel to each other, and the third portion of the tube is disposed between the first portion of the tube and the second portion of the tube.

3. The apparatus of claim 2, where the first portion of the tube and the second portion of the tube are the same length.

4. The apparatus of claim 2, the least one turbulence generating device further comprising:
 a first turbulence generating device integrally formed as part of the first portion; and
 a second turbulence generating device integrally formed as part of the second portion;
 where the first turbulence generating device and the second turbulence generating device are the same length.

5. The apparatus of claim 1, wherein the first end of the tube and the second end of the tube protrude out of the same side of the casting block.

6. The apparatus of claim 1, wherein the inner diameter of the plurality of ribs is 25% less than the inner diameter of the tube.

7. The apparatus of claim 1, where in the tube has an elliptical cross-section.

8. A casting block assembly having a turbulence generating device, the casting block assembly comprising:
 a casting block;
 a tube having a circular cross-section, the tube extending through the casting block, the tube further comprising:
  a first end;
  a first portion integrally formed with the first end;
  a second end;

a second portion integrally formed with the second end, the second portion in fluid communication with the first portion;

a third portion integrally formed with and disposed between the first portion and the second portion such that the third portion is in fluid communication with the first portion and the second portion;

a first turbulence generating device integrally formed as part of the first portion, and the casting block surrounds the outside of the first turbulence generating device, the first turbulence generating device further comprising:

a first plurality of ribs integrally formed as part of the first portion of the tube, each of the first plurality of ribs having a circular cross-section, and the outer diameter of each of the first plurality of ribs is less than the inner diameter of the tube, and the outer diameter of each of the first plurality of ribs is less than the inner diameter of the first end, and less than the inner diameter of the second end, and less than the inner diameter of the entire third portion;

a second turbulence generating device integrally formed as part of the second portion, and the casting block surrounds the outside of the second turbulence generating device, the second turbulence generating device further comprising:

a second plurality of ribs integrally formed as part of the second portion of the tube, each of the second plurality of ribs having a circular cross-section, and the outer diameter of each of the second plurality of ribs is less than the inner diameter of the tube, and the outer diameter of each of the second plurality of ribs is less than the inner diameter of the first end, and less than the inner diameter of the second end, and less than the inner diameter of the entire third portion;

wherein the first turbulence generating device and the second turbulence generating device are surrounded by the casting block.

9. The casting block assembly of claim 8, wherein the first portion of the tube and the second portion of the tube are parallel to each other.

10. The casting block assembly of claim 8, wherein the first portion of the tube and the second portion of the tube are the same length.

11. The casting block assembly of claim 8, wherein the first turbulence generating device and the second turbulence generating device are the same length.

12. The casting block assembly of claim 8, wherein the first end of the tube and the second end of the tube protrude out of the same side of the casting block.

13. The casting block assembly of claim 8, wherein the inner diameter of the plurality of ribs is 25% less than the inner diameter of the tube.

14. The casting block assembly of claim 8, wherein the tube has an elliptical cross-section.

* * * * *